Figure 1:
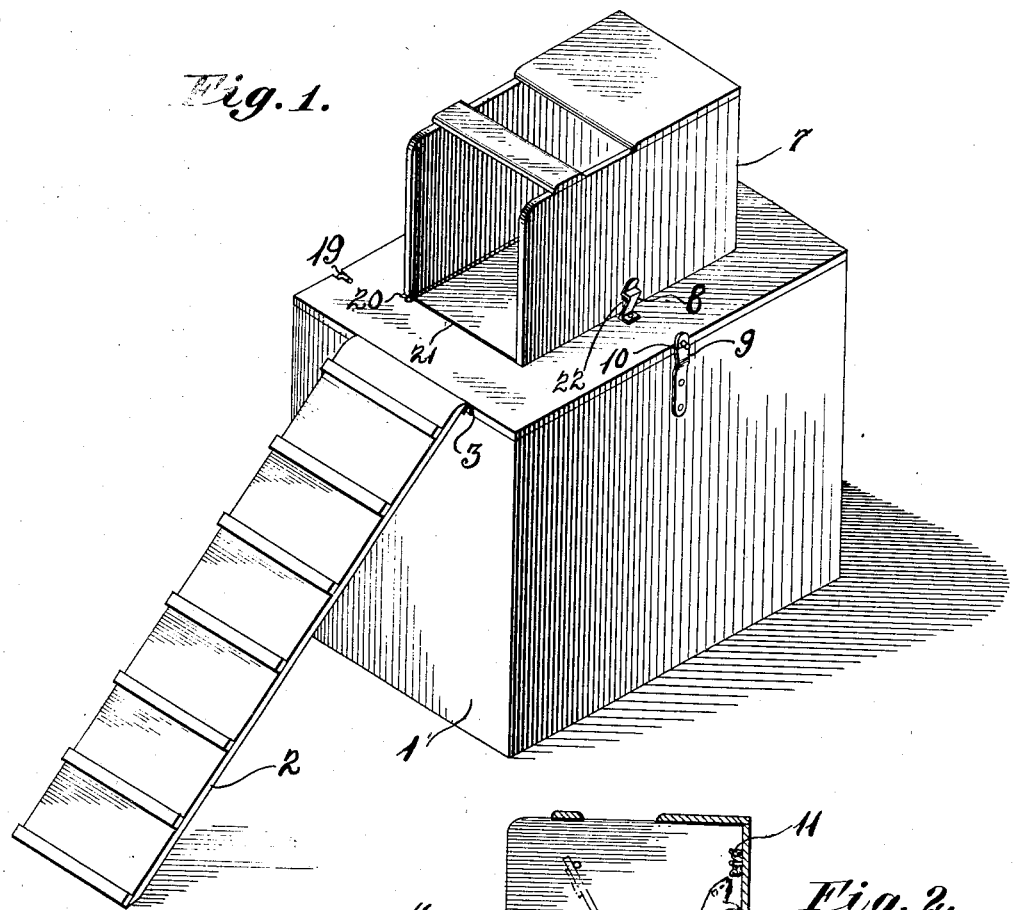

F. WÓJCIK.
MULTIPLE TRAP.
APPLICATION FILED JAN. 19, 1920.

1,353,882.                                Patented Sept. 28, 1920.

Inventor
Frank Wójcik
By Attorney

UNITED STATES PATENT OFFICE.

FRANK WÓJCIK, OF HOLYOKE, MASSACHUSETTS.

MULTIPLE TRAP.

1,353,882.  Specification of Letters Patent.  Patented Sept. 28, 1920.

Application filed January 19, 1920. Serial No. 352,354.

*To all whom it may concern:*

Be it known that I, FRANK WÓJCIK, citizen of Poland, and resident of Holyoke, in the county of Hampden and State of Massachusetts, have invented certain new and useful Improvements in Multiple Traps, of which the following is a specification.

This invention relates to traps, and particularly that class of traps useful for catching mice, rats, and other rodents.

One object of the invention is to provide such a trap which will have the capacity and means for catching a number of rodents, instead of only one, as is the case with traps most generally used.

Another object of the invention is to provide a trap having means operable by a rodent to imprison the rodent, the entrapping means of the trap thereupon, on the safe imprisonment of said rodent, resuming its previous position so as to be able to entrap a second rodent. By providing a receiving chamber for the rodents, of sufficient capacity, any number of rodents within the said capacity may be entrapped without attention to the trap.

The above and other objects will become apparent in the description below, in which characters of reference refer to like-named parts in the drawings.

Referring briefly to the drawings, Figure 1 represents my device in perspective projection.

Figure 2:
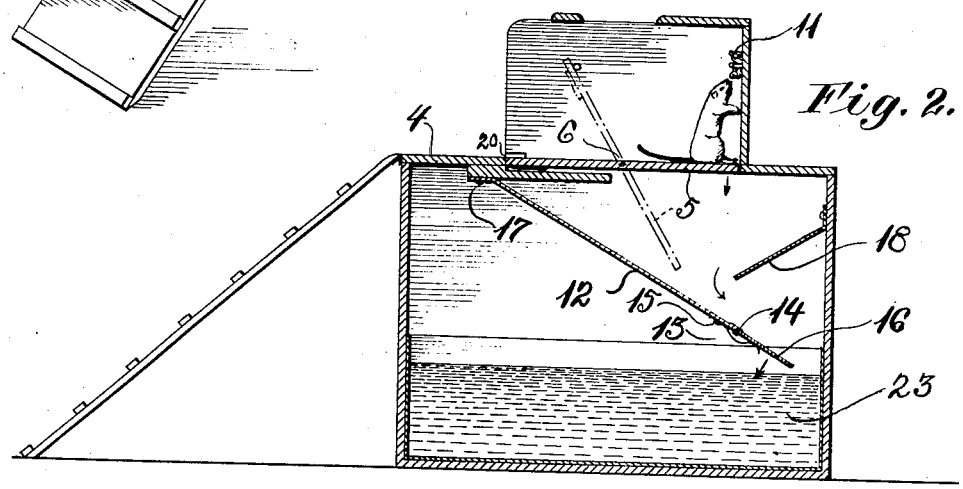

Fig. 2 represents the same in a cross-sectional elevational view.

Referring now in detail to the drawings, the numeral 1 indicates the main frame of my device, and a ladder or runway 2 is hingedly mounted thereon at 3. A platform 4 having an oblong hole 21 therein, comprises the top of said frame 1. Said top 4 is hingedly attached to said frame 1 by means of hinges 19, and a door 5 is mounted, upon a shaft 6, adapted to cover said hole or opening. Said door is so mounted that the greater part of its weight is to the left of said shaft, so that normally said door rests in a horizontal position so as to close said opening.

A house-like structure 7 is hingedly attached to the platform 4 at 20, said structure standing over said opening 21. A spring catch 8 is secured to the platform 4 adjacent the side of the structure 7, which has a protruding pin 22 adapted to be engaged by said catch 8, the latter having a shoulder therein for that purpose. A catch 9 is also attached to the frame 1 so as to engage a pin 10 on the edge of the platform 4.

An inclined panel or chute 12 is attached, by means of screws 17, to the underside of the platform 4, under the opening 21. A shorter panel or chute is attached to the side wall of the frame 1, as at 18, also inclined, so as to overshadow the end of the chute 12. A tongue-like extension 16 is attached to the end of the chute 12 by means of a pin or pivot 14, and a spring 13 is attached to the underside of said chute 12 so that its free end presses upwardly against the said extension, keeping the latter normally in the same plane as the chute 12. The inner wall of the structure 7 has a hook or the like thereon upon which is secured a piece of bait 11.

Now the operation of the device is as follows: The rodent is attracted by the bait 11, so that he enters the structure 7 to obtain said bait. He thereupon walks along the door 5 toward the bait, and when he has passed the shaft 6, so as to overbalance the weight of said door to the left of said shaft, the door swings in a clockwise direction, dropping the rodent down through the opening 21. In its descent the rodent strikes the chute 12, slides down the same, and then falls into the water 23 in the bottom of said frame 1. Should the rodent attempt an escape, the extension 16 would yield under his weight, so that he could not rise out of the water. After the fall of the rodent, the door 5 has resumed its normal position so as to close the opening 21, and the trap is ready to receive another animal; thus the trap may operate indefinitely without attention.

Having thus described my invention, what I claim and desire to secure by Letters Patent is as follows:

A multiple trap comprising a frame, a platform on the top of said frame, an opening in said platform, a door pivotally mounted so as to normally close said opening, the center of gravity of said door being situated to one side of the pivot thereof, an inclined chute attached to the underside of said platform under said opening, a second inclined chute attached to the wall of said frame and overshadowing said first-named chute, an extension resiliently and pivotally attached to the end of said first-named chute, and water or the like in the bottom of said frame under said opening.

Signed at Holyoke, in the county of Hampden and State of Mass., this 26 day of December, A. D. 1919.

FRANK WÓJCIK.